Feb. 9, 1960 — W. HARTMANN — 2,924,440
SOFT-ICE MAKER FOR REFRIGERATORS
Filed Sept. 6, 1957
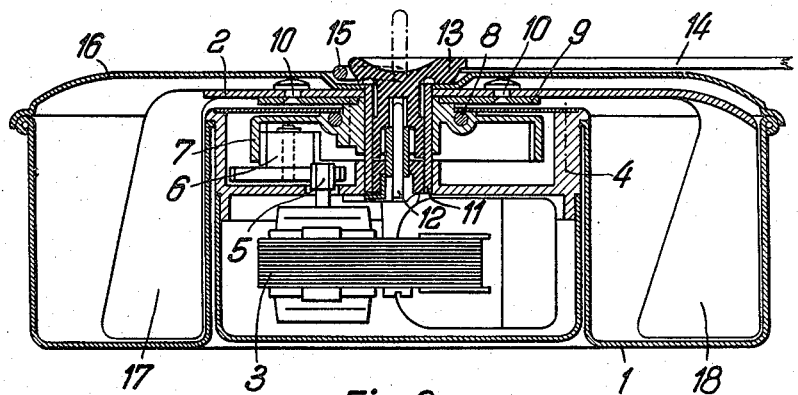
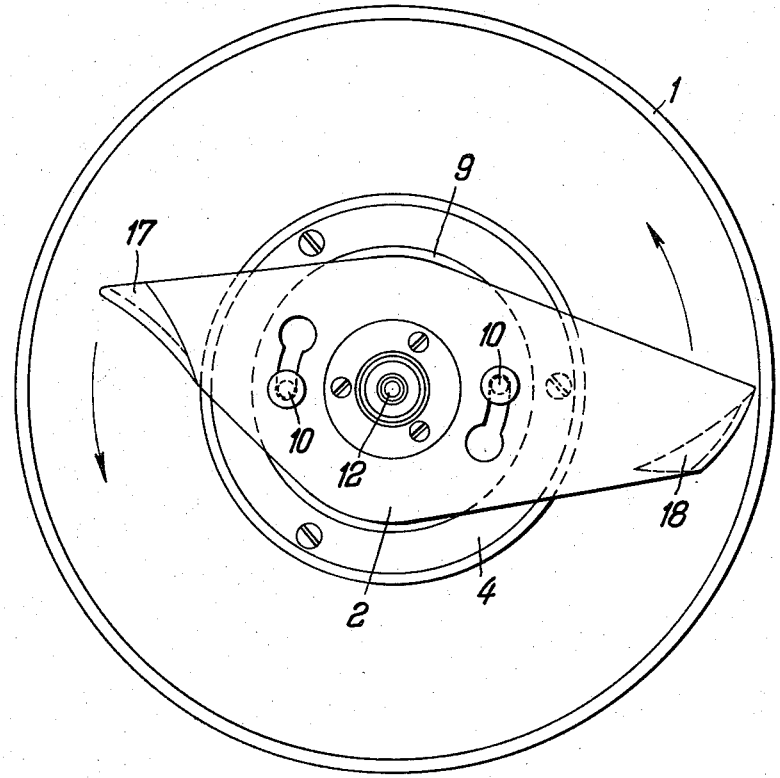
Inventor:
Willy Hartmann

2,924,440
SOFT-ICE MAKER FOR REFRIGERATORS

Willy Hartmann, Stuttgart, Germany, assignor to Brown, Boveri & Cie Aktiengesellschaft, Mannheim, Germany, a corporation of Germany Application September 6, 1957, Serial No. 682,483

Claims priority, application Germany September 7, 1956

6 Claims. (Cl. 259—108)

The invention relates to a soft-ice maker to be used in refrigerators or freezers for making ice cream, frozen custard, sherbet and similar soft-frozen products.

In known devices of this type, the mass to be frozen is kept in motion by several stirrer members in an elongated rectangular container. The stirrer members are driven by a transmission from an electric motor mounted at one end of the elongated container above the container space and secured to the cover of the container. These devices have various shortcomings. Only part of the bottom and wall surfaces in the container are scraped by the stirrer members so that ice granules may form at the localities not reached. The driving mechanism located above the container space increases the over-all height. This is undesirable since the freezing compartments of most smaller-size domestic refrigerators are rather shallow. The weight of the electric motor, located at one end of the container, makes the device unstable and unhandy. Often an additional holding device for the cover is necessary because of the unilateral load imposed upon it by the motor.

It is an object of the invention to devise a soft-ice maker for the above-mentioned purposes which obviates such deficiencies of the known devices.

To this end, and in accordance with a feature of the invention, the container for the reception of the mass to be frozen is given annular shape, and the electric motor with the transmitting mechanism for driving the stirrer is centrally mounted within the hollow space formed by the ring-shaped container. As a result, a stable design of utmost simplicity and low over-all height is achieved. The stirrer reaches all points of the bottom and side walls of the container and keeps the entire mass in continuous motion so that a good quality of the product is secured.

The stirrer, comprising one or more blades mounted upon a rotating arm, may be given one-part or multiple-part design. Particularly simple and advantageous is a stirrer with two blades of which one engages the outer side wall and one half of the bottom surface, whereas, the other blade acts upon the inner side wall and the remainder of the bottom surface in the ring-shaped container.

According to another feature of the invention, the angle of attack of the outer blade, relative to the mass to be frozen in the ring-shaped container, is so chosen that it pushes the mass from the outside toward the interior, whereas the second stirrer blade is given such an angle of attack that it moves the mass from the inside toward the outside. This causes a continuous and periodic horizontal forward and return motion of the mass to be frozen which greatly improves the quality of the soft-ice product.

According to another feature of the invention, the stirrer assembly is made readily insertable and removable by providing the blade-supporting stirrer arm with keyhole-shaped openings by means of which it can be hung into corresponding entrainers of the driving transmission. The central drive of the stirrer arm further permits the use of a reliable shaft seal which securely tightens the driving motor and mechanism toward the interior and exterior of the device.

According to a further feature of the invention, the device is provided with a hollow stationary shaft which is located in the center space of the device and upon which the stirrer drive is journalled. Mounted on this stationary center shaft is the electric connecting member for receiving an appliance plug connector. This connector plug member is preferably given a shallow design to prevent increasing the over-all height of the device, and is provided with a handle that can be turned upwardly to readily permit seizing the plug and pulling it out of the device.

The ring-shaped soft-ice maker according to the invention has the further advantage of a large exterior surface as compared with its content, whereby the temperature exchange is accelerated and the time needed for soft-ice production is reduced. The favorable central distribution of weight renders the device particularly handy and eliminates the need for a locking and latching device of the cover.

These and more specific objects, advantages and features of the invention, the essential features being set forth with particularity in the claims annexed hereto, will be apparent from the following description in conjunction with the embodiment of an ice-maker according to the invention illustrated on the drawing, in which:

Fig. 1 shows a cross section through the center axis of the device; and

Fig. 2 shows a top view of the device, the cover and electric leads being removed.

The illustrated device comprises a ring-shaped container 1 in whose annular pot space two stirrer blades 17 and 18 are rotatable. The blades are mounted on a stirrer arm 2 rotatable about the vertical center axis of the device. An electric motor 3 is mounted together with the housing 4 of a step-down transmission. The motor-and-transmission assembly is located in the central hollow space formed by the container 1. The height of the assembly, including the motor and the transmission mechanism, does not exceed the height of the container 1. The shaft of the electric motor 3 carries a pinion 5 which, through a set of intermediate spur gears, drives an interior spur gear 7 rotatable in coaxial relation to the ring-shaped container 1. A gasket ring 8 prevents ingress of humidity into the mechanism as well as escape of grease out of the enclosed driving transmission. An entrainer disc 9 carries two coupling pins 10 and is frictionally or rigidly joined with the spur gear 7 to rotate together therewith. The stirrer arm 2 has two keyhole-shaped openings by means of which the stirrer can readily be mounted upon, or taken off, the coupling pins 10 of the entrainer disc 9.

The spur gear 7 rotates on a stationary hollow shaft 11. Shaft 11 carries the male plug-connector member 12 for supplying electric current to the motor 3. When in operation, a female connector member 13 is plugged onto the connector member 12 as is customary for electric household appliances. Mounted on the plug member 13 is a handle 15 which can be turned upwardly in order to facilitate pulling the connector member 13 out of the device. When the handle 15 is turned down into the illustrated position, it does not increase the over-all height of the device when placed into the refrigerator or freezer.

The container 1 is provided with a cover 16. The slightly curved blades 17 and 18 of the stirrer 2 wipe over the bottom and the two side walls of the ring-shaped container 1. That is, the blade 17 extends close to the inner wall of the container and over the inner portion of the container bottom, whereas the blade 18 extends close to the outer wall and over the outer portion of the container bottom. The two blades keep the mass to be frozen in continuous horizontal inward and outward motion. This is so because the curvature of the two blades is such that one blade imparts to the mass a horizontal motion opposite to that produced by the other blade. In order to prevent squirting of the mass upwardly, it is preferable to let the angle of attack on blades 17 and 18 decrease upwardly, or to provide the blades with suitable perforations.

The central housing 4 of the transmission and motor is preferably insertable into the central space of container 1 as a separate unit. The reactive torque imposed by the rotating stirrer arm 2 onto the housing 4 can be taken up by any desired device that prevents rotation between housing 4 and housing 1. For example, the housing 4 may simply be provided with a boss or rib which engages a groove in the inner edge of container 1, thus locking the housing 4 from rotating relative to container 1.

The shape of the ring-shaped ice container 1 shown on the drawing is suitable for making the container from sheet metal. When producing the container by casting or injection molding, the container may readily be provided with a bottom which extends beneath the central hollow space. Such a through-bottom contributes to faster heat exchange and thus to further shortening the freezing time required for a given product.

It will be understood by those skilled in the art, upon a study of this disclosure, that the invention permits of various modifications with respect to details and hence may be embodied in devices other than the one particularly illustrated and described herein, without departing from the essence of the invention and within the scope of the claims annexed hereto.

I claim:

1. A soft-ice maker for refrigerators, comprising a ring-shaped container for the material to be frozen, said container forming an annular pot space and a hollow central space, an electric motor mounted in said central space, a stirrer rotatable in said pot space, a transmission connecting said motor with said stirrer, said motor and said transmission being confined within said hollow central space, said transmission comprising an internal disc horizontally rotatable above said motor and at the top of said central space, said internal disc having coupling pins, and said stirrer having keyhole-shaped openings engageable with said respective pins, for removably locking said stirrer to said disc.

2. A soft-ice maker for refrigerators, comprising a ring-shaped container for the material to be frozen, said container forming an annular pot space and a hollow central space, an electric motor mounted in said central space, a stirrer rotatable in said pot space, and a transmission connecting said motor with said stirrer, said motor and said transmission being confined within said hollow central space, a stationary hollow shaft located in said central space in coaxial relation to said ring-shaped container, said stirrer being rotatable on said hollow shaft, and electric current supply means extending from the outside through said hollow shaft to said motor.

3. A soft-ice maker according to claim 2, said current supply means comprising a fixed connector member having a central plug-pin and a hollow plug-pin coaxially disposed around said central plug-pin, said connector being mounted within said hollow shaft, and a mating connector member insertable from above into said hollow shaft for engagement with said fixed connector member.

4. A soft-ice maker for refrigerators, comprising a ring-shaped container for the material to be frozen, said container forming an annular pot space and a hollow central space, an electric motor mounted in said central space, a stirrer rotatable in said pot space, and a transmission connecting said motor with said stirrer, said motor and said transmission being confined within said hollow central space, a stationary hollow shaft located in said central space in coaxial relation to said ring-shaped container, said stirrer being rotatable on said hollow shaft, and electric current supply means extending from the outside through said hollow shaft to said motor, said current supply means comprising a fixed connector member having a central plug-pin and a hollow plug-pin coaxially disposed around said central plug-pin, said connector being mounted within said hollow shaft, and a mating connector member insertable from above into said hollow shaft for engagement with said fixed connector member, said mating connector having a handle pivotally mounted thereon, said handle being movable from horizontal to upright position to facilitate pulling said mating connector out of said hollow shaft.

5. A soft-ice maker adapted to be removably disposed within the freezing compartment of a domestic refrigerator and comprising a ring-shaped container for the material to be frozen, said container forming an annular pot space and a hollow central space, an electric motor mounted in said central space, a stirrer rotatable in said pot space, a transmission connecting said motor with said stirrer, said motor and said transmission being confined within said hollow central space, the height of said motor and transmission being less than the overall height of said container so as to be adapted to be accommodated into said freezing compartment, said transmission comprising an internal disc horizontally rotatable above said motor and at the top of said central space, said disc having coupling pins, and said stirrer having keyhole-shaped openings engageable with said respective pins for removably locking said stirrer to said disc.

6. A soft-ice maker adapted to be removably disposed within the freezing compartment of a domestic refrigerator and comprising a ring-shaped container for the material to be frozen, said container forming an annular pot space and a hollow central space, an electric motor mounted in said central space, a stirrer rotatable in said pot space, and a transmission connecting said motor with said stirrer, said motor and said transmission being confined within said hollow central space, the overall dimensions of said motor and said transmission not exceeding the overall dimensions of said container so as to permit said soft-ice maker to be adapted to be removably insertable into said freezing compartment, a stationary hollow shaft located in said central space in coaxial relation to said ring-shaped container, said stirrer being rotatable on said hollow shaft, and electric current supply means extending from the outside of said soft-ice maker through said hollow shaft to said motor.

References Cited in the file of this patent

UNITED STATES PATENTS

| | | |
|---|---|---|
| 1,841,434 | Gibson | Jan. 19, 1932 |
| 1,885,139 | Porter | Nov. 1, 1932 |
| 2,295,136 | Stiers | Sept. 8, 1942 |
| 2,416,326 | Knibb | Feb. 25, 1947 |
| 2,817,502 | Yohe | Dec. 24, 1957 |
| 2,850,268 | Miller et al. | Sept. 2, 1958 |

FOREIGN PATENTS

| | | |
|---|---|---|
| 158,828 | Australia | July 9, 1953 |